US010722810B1

(12) United States Patent
Kyrejko

(10) Patent No.: US 10,722,810 B1
(45) Date of Patent: Jul. 28, 2020

(54) METHOD FOR LOW TEMPERATURE, REDUCED PRESSURE, DISTILLED BEER SPIRITS AND CONCENTRATES FROM FINISHED BEER AND BEER RESIDUES

(71) Applicant: THE ENGINE ROOM LLC, Brooklyn, NY (US)

(72) Inventor: David Kyrejko, Brooklyn, NY (US)

(73) Assignee: ANALOG LIQUID LLC, Brooklyn, NY (US)

(*) Notice: Subject to any disclaimer, the term of this patent is extended or adjusted under 35 U.S.C. 154(b) by 0 days.

(21) Appl. No.: 16/139,740

(22) Filed: Sep. 24, 2018

Related U.S. Application Data

(60) Provisional application No. 62/562,199, filed on Sep. 22, 2017.

(51) Int. Cl.
  *B01D 3/10* (2006.01)
  *C02F 3/06* (2006.01)
  *C02F 3/08* (2006.01)
  *B01D 3/00* (2006.01)

(52) U.S. Cl.
  CPC ............ *B01D 3/106* (2013.01); *B01D 3/003* (2013.01); *C02F 3/08* (2013.01)

(58) Field of Classification Search
  CPC ............ B01D 3/003; B01D 3/106; C12F 3/08
  See application file for complete search history.

(56) References Cited

U.S. PATENT DOCUMENTS 5,384,135 A * 1/1995 Caluwaerts ............ C12C 12/04
                                                                426/14
2010/0047422 A1 * 2/2010 Magalhaes Mendes ............
                                                                A23L 2/56
                                                                426/494

* cited by examiner

*Primary Examiner* — Brian A McCaig
(74) *Attorney, Agent, or Firm* — Cowan, Liebowitz & Latman, P.C.; Mark Montague; Brian S. Matross

(57) ABSTRACT

A distillation system/method for distilling finished beer and beer residues into spirits or non-alcoholic concentrates employs distillation under low temperature(s) via vacuum pressure to beneficially prevent degradation of the base product to further beneficially capture volatile compounds that are distinctly "of beer" (or indicative of other base compounds) aroma and flavor in the final distilled product. The system also distills and separates valuable volatile components, such as hop oils, from beer waste without degradation or contamination of the flavors, thus allowing for their use, reclamation and repurposing. The system/process maintains the quality of beer through the entire distillation process, thus creating spirits and concentrates of higher quality that contain the distinct character of the beers (or other base compound) from which they originate.

12 Claims, 3 Drawing Sheets

METHOD FOR LOW TEMPERATURE, REDUCED PRESSURE, DISTILLED BEER SPIRITS AND CONCENTRATES FROM FINISHED BEER AND BEER RESIDUES

REFERENCE TO RELATED APPLICATION

This application claims priority to U.S. Provisional Patent Application No. 62/562,199, filed Sep. 22, 2017, the disclosure of which is incorporated herein by reference.

FIELD OF THE INVENTION

The present invention is directed to a process and system for distilling finished beer and beer residues into spirits or non-alcoholic concentrates. The present invention particularly employs novel low-temperature/vacuum pressure distilling that prevents degradation of the base product and captures the volatile compounds that are distinctly "of beer" in the final, distilled product. The present invention also is directed to a system/method of distilling the separates valuable volatile components, such as hop oils, from beer wastes without degradation or contamination.

BACKGROUND

Beers, especially "craft beer" or "micro brews" are common today, and many are known for their exceptional flavor, wide variety, and constant ingenuity. Attempts have been made to distill these delicate products in the past using conventional distillation techniques. The results have been products that either contained material too degraded to be deemed palatable or found to be lacking the key components that made it recognizable as originating from beer. The beer-based products that make their way to market are largely indistinguishable from the products that are not made from beer.

In an attempt to resolve this shortcoming, some products are specifically modified to be marketed as "distilled from beer." However, these marketed products, by design and process, are lacking the components of finished beers. The currently known distillation processes, utilized in the industry for these beers, typically remove the problem ingredients, such as hops (or hops components). However, without these ingredients, the finished distilled product lacks the quality and distinct flavor of the beer, for which it is marketed. In some cases, a distilled product (with the removed hop) is "flavored" after the distillation. This, however, modifies the original flavor profile, and makes the resulting product very different in flavor components from the beer, from which it claims to originate.

Moreover, by introducing the post-distillation "flavoring," the final products lose the distinction of being purely "distilled" products, such as whiskey or gin, and would instead have to take on the lower classification of a "flavored" spirit.

Another problem with currently known distillation methods is that the beer production also produces large quantities of waste products. One common waste product is in a form of a post-fermentation slurry that may contain hop matter, adjuncts, yeast and other by-products. The breweries dispose of the waste products according to the local laws and are unable to re-use them.

As with finished beer, these wastes are highly sensitive to the thermal degradation, oxidative damage. Moreover, the inclusion of living biological material (yeast and other organisms used in the brewing process) makes their recovery even more complicated. Microorganisms begin to autolyse (die) at the temperature around 120° F. or 48.8° C., but they also begin to introduce chemicals (at the temperature as little as 94° F. or 34.4° C.) that greatly contribute to off-flavors that contaminate any recovered material. Thus, there is a need for a system and a distillation method that would allow an efficient recovery of these living biological materials and capturing of the essential flavor components and flavor profile of beer.

Some of the most valuable recovered products are the essential oils and terpenes present in the hop blossoms. These occur at a very small percentage of the total weight of the hop blossom, and they are highly valued for their flavor and olfactory properties in the hop bearing products. Recovering these products from the second use, post-fermentation product also has the added advantage of the "bio-transformation" process, observed as part of the beer production. Distilled products made from virgin ingredients are quite different from a post-fermentation based distillate due to this phenomenon. Thus, there is a need for an improved distillation process that would produce oils and terpenes of a flavor and quality that are closer to those found in the fermented beer, and superior to those that are produced through conventional known methods (pre-fermentation or raw hops extracted for oils). Examples of conventional methods are described at https://doi.org./10.1016/j.cervis.2011.12.005, which is incorporated herein by reference.

One of the problems of processing the delicate materials in the hop blossoms and other beer waste materials lies with the distillation methods that are employed, as well as the quality of the product being distilled. Conventional known distillation methods utilize high temperatures, which degrade or catalyze the beer's components with important flavor profile.

For example, the typical beverage distillation process occurs at 190-215° F. The known conventional distillation systems typically operate at atmospheric pressures, and suffer from the above-mentioned limitations that are caused by the high temperature distillation. The problems are further complicated by the presence of the solid, thermally sensitive components in the beer (e.g., residual yeast, hop solids), which the known and currently used distillation processes are not able to handle properly and/or typically do not preserve.

Another problem with the known distillation systems and methods is the preparation of the beer or residues prior to distillation. During fermentation, large quantities of non-condensable vapors, primarily Carbon Dioxide ($CO_2$) are produced and remain present in the beer liquids and solids. $CO_2$, being non-condensable, must be released from the distillation system, often with great care. $CO_2$ can exhibit "stripping" abilities when it is removed from liquids in large quantities. To that end, it is utilized in many industries that target deodorizing products.

The "stripping" occurs when the $CO_2$ physically carries volatile components with it, as it comes out (in gas form) of the liquid in which it is dissolved. Unfortunately, these volatile components represent some of the most delicate and key aromas and flavors unique to beers. The use of the temperatures utilized with the known conventional distillation systems only furthers this problem as it causes the rate of degassing to increase. This produces an undesired result of having a "deodorized" beer product, before any distillation has even started.

Thus, there is also a need for a system and process that would negate the thermal degradation, $CO_2$ stripping effects, and a reaction potential. This is particularly important for beers that contain hops, organic acids, or living microbial organisms. Hop utilization in beer brewing has been of high interest to brewers, and the industry has compiled a list of best practices and procedures for their use.

One of the primary concerns among the best practices and procedures set forth by the industry is the negative effect of conventional distillation and pre-processing on the volatile non-bittering (aromatic) components of the hop blossoms. This aromatic quotient is made up of hop essential oils (terpene hydrocarbons) that consist mostly of myrcene, humulene and caryophyllene. These components are highly unstable and will react or polymerize may render them useless as flavors and scents. It is for this reason that hops are quickly processed immediately after the harvest, packaged with nitrogen only, and stored at near freezing temperatures. Thus, there is a need to obtain the correct aromatic and flavor profile of the above-mentioned compounds.

Furthermore, organic acids are found to some degree in all beers but at greater concentrations in "sour" beers. These beers have a distinctive acid note to them and are widely believed to be impractical or impossible to distill using the conventional known means. This belief stems from the fact that a chemical reaction occurs when the acids found in the beer react under heating, with the alcohols present in beer.

While this reaction will occur under relatively ambient temperatures, as well as at the high temperatures utilized in conventional distillation methods, the reaction at lower temperatures is very slow. Conventional or high temperature distillation creates a large amount of undesirable esters that must be removed and discarded prior to collection. However, while the esters are discarded, the aromatics of the same relative volatility are also discarded in the known, conventional methods. The reaction also has a degrading effect on the typically copper machines that are used for conventional distillation, which may result in the undesired damage to the distillation equipment. The low temperatures utilized in this invention (discussed below) prevent the formation of undesirable esters through the esterification of organic acids and alcohols preventing the need for their removal and preserving the native ester content of the initial beer product.

Microbiological organisms are the fundamental ingredients to the creation of beer. Because of this, traces of these organisms (usually yeasts) are found in beer unless they have been sterile filtered. In the case of beer residues and wastes, microbes may form a significant (to majority) portion of the whole product. While generally hardy, these biological creatures are destroyed fairly easily by temperatures in excess of 120° F., which are utilized in the known conventional distillation processes. At these high temperatures, the cell walls of the microbiological organism rupture or "lyse."

The destruction and even the stress related to the lead-up to the cell-death of microorganisms releases a host of amino acids, nitrogen compounds, proteins, and mercaptans that react with the surround material. This creates volatile off-flavors in a distillate, which must be removed to make the product palatable. This "finishing" process may include barrel aging, filtering, fining, carbon adsorption, chemical reactions, or even the aforementioned CO2 gas stripping. The undesirable side effect of the "finishing" of a product in this manner by the known and conventional systems and method is the negative impact on the ultimate flavor and aroma of the distillate, removing many of the integral "beer" flavor components along with the offending flaws. Thus, there is a need for a system and method that not cause the destruction of the microorganisms and avoid the need to remove the undesired off-flavors produced by the lysing and the lead-up to the cell death of the microbial content. There also is a need for a system and method that prevents harm to the microbial content of the beer or beer waste even as it is being distilled.

The present invention addresses and resolves some or all of the above-mentioned limitations and shortcomings of known systems and methods.

SUMMARY OF THE INVENTION

In view of the foregoing, the present invention, in accordance with various system embodiments of the present invention, in summary terms, is a unique distillation system that includes a vacuum distillation vessel configured to receive and distill an initial product having volatile components to separate at least some of the volatile components, a condenser (or multiple condensers) configured to capture and condense the separated volatile components, a vacuum configured to apply pressure within the vacuum distillation vessel sufficient to cause some (or more) of the volatile components to boil within the vacuum distillation vessel at a reduced temperature substantially lower than the temperature at which the volatile components boil at atmospheric pressure, wherein the vacuum controls the temperature of the initial product and the separated volatile components to remain at or below that reduced temperature.

As an aspect of the present invention, the vacuum applies pressure within the vacuum distillation vessel sufficient to cause both the initial product and the volatile components to not exceed a temperature of 113° Fahrenheit.

As another aspect of the present invention, the vacuum distillation vessel is further configured/designed/controlled to remove non-condensable gas from the initial product prior to distillation or concurrently with distillation.

As a further aspect of the present invention, the initial product is a beer.

As a feature of this aspect, the initial product includes a substantial amount of compounds that are unstable at temperatures above 120° Fahrenheit, and the vacuum distillation vessel and the condenser are configured/designed/controlled to maintain the stability of these compounds that are unstable at temperatures above 120° Fahrenheit.

As another aspect of the present invention, the initial product includes beer wastes having hop particles, with the hop particles containing hop essential oils, and the condenser is configured to capture and condense the separated volatile components along with the hop essential oils, and the reduced temperature is sufficiently low so that distillation in the vacuum distillation vessel and condensing in the condenser do not degrade the hop essential oils.

As a further aspect of the present invention, the initial product includes living microbial organisms that are destroyed or substantially damaged at temperatures in excess of 120° Fahrenheit, and the condenser is configured/controlled to capture and condense, from the vacuum distillation vessel, separated volatile components having living microbial organisms that are substantially unaffected from the distillation in the vacuum distillation vessel.

As yet another aspect of the present invention, the condenser is configured/controlled to condense high volatile components from the separated volatile components, and the distillation system further includes a trap that is designed/configured to trap the condensed high volatile components.

As a feature of this aspect, the distillation system further includes a collection vessel configured to combine some (or all of) the trapped condensed high volatile components with a liquefied form of the condensed separated volatile components to produce a final condensate product of the system.

As a further aspect of the present invention, the final condensate product of the distillation system does not contain ethanol.

As yet another aspect of the present invention, the vacuum distillation vessel is further configured to degas the initial product prior to or during distillation carried out by the vacuum distillation vessel.

The above summarized features and aspects of the system embodiment(s) of the present invention represent some of the particularities of the invention and, thus, do not represent every possible particularity. In the detailed description below, additional relevant aspects, features, variations, etc., of the system embodiment(s) are presented.

Having described the representative system embodiment(s) of the invention, and some of its features and aspects, the present invention further entails novel methods of distillation in accordance with the present invention.

Accordingly, and in accordance with various method embodiments of the present invention, the present invention further is a distillation method that comprises the steps of receiving an initial product having volatile components, distilling the initial product within a vacuum distillation vessel to separate at least some of the volatile components, capturing and condensing the separated volatile components within a condenser (or multiple condensers), applying pressure within the vacuum distillation vessel sufficient to cause the the volatile components to boil within the vacuum distillation vessel at a reduced temperature substantially that is lower than the temperature at which the volatile components boil at atmospheric pressure, and controlling the temperature of the initial product and the separated volatile components to remain at or below that reduced temperature.

As an aspect of this method embodiment, pressure is applied within the vacuum distillation vessel sufficient to cause some (or more) of the volatile components to boil within the vacuum distillation vessel at a reduced temperature that doesn't exceed 113° Fahrenheit.

As a further aspect of the method embodiment, the method further comprises the step of removing a non-condensable gas from the initial product prior to distillation or concurrently with distillation.

As another aspect of the method embodiment, the initial product used in the distillation method is a beer.

As a feature of this aspect, the initial product used in the distillation method includes a substantial amount of compounds that are unstable at temperatures above 120° Fahrenheit, and the distillation method entails controlling the temperature of the initial product and the separated volatile components to maintain the stability of those compounds that are unstable at temperatures above 120° Fahrenheit.

As a further aspect of the method embodiment, the initial product used in the distillation method includes beer wastes having hop particles, with the hop particles containing hop essential oils, the separated volatile components are captured and condensed along with the hop essential oils, and pressure is applied to cause the reduced temperature to be sufficiently low so that the beer wastes are distilled during the distilling step in a manner that does not degrade the hop essential oils in the hop particles.

As another aspect of the method embodiment, the initial product used in the distillation method includes living microbial organisms that are destroyed or substantially damaged at temperatures in excess of 120° Fahrenheit, and the distillation method, including the condensing step, results in a product that includes living microbial organisms that were not affected (or at least substantially unaffected) by the distillation method.

As yet a further aspect of the method embodiment, the distillation method further includes the steps of condensing high volatile components from the separated volatile components, and trapping those condensed high volatile components.

As a feature of this aspect, the distillation method also includes the step of combining a portion (or more) of the trapped condensed high volatile components with a liquefied form of a portion (or more) of the condensed separated volatile components to produce a final condensate product.

As yet another aspect of the method embodiment, the distillation method produces a final condensate product that does not contain ethanol.

As yet an additional aspect of the method embodiment, the distillation method includes degassing the initial product prior to or during the step of distilling the initial product.

Like the above summarized system embodiment(s), and its summarized features and aspect, the above summarized method embodiment(s), and its features and aspects, represent some, but certainly not all, of the particularities of the methods of the present invention. Additional embodiments, features, aspects are described in the following detailed description.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF INVENTION

Figure 1:
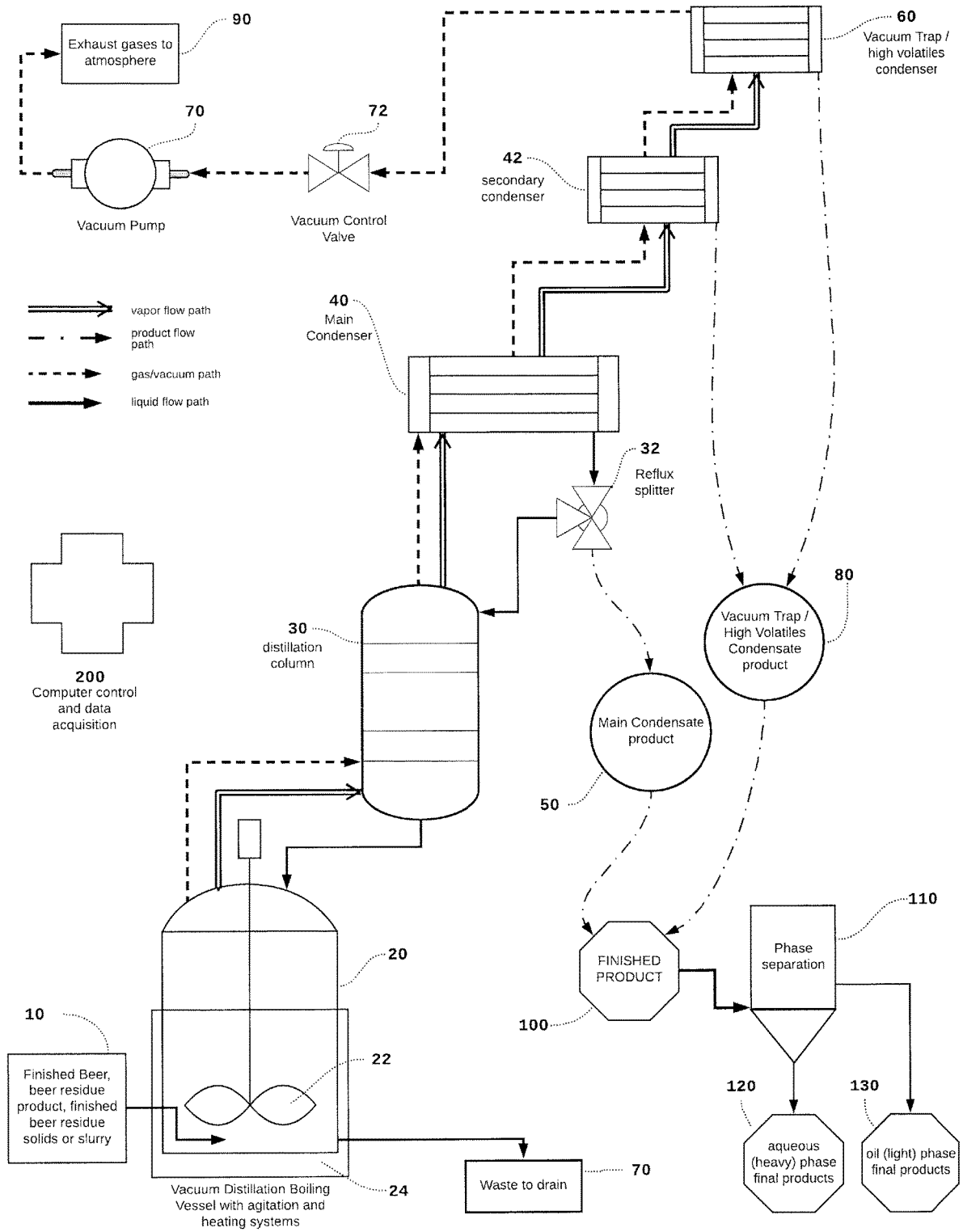
FIG. 1 is a schematic illustration of distillation system in accordance with various embodiments of the present invention.

The following detailed description is made with reference to the accompanying drawings. However, the drawings are provided for illustrative purposes only and are not intended to limit the scope of the invention. For instance, and as mentioned herein, a system in accordance with the present invention and/or employed to carry out the process in accordance with one or more embodiments of the present invention may include more structural components than that shown in the figures. Conversely, a system in accordance with other embodiments of the present invention may employ fewer components than that shown in the figures.

In connection with the description herein, discussion and/or explanation about components known in the art are not described in exhaustive detail for the purpose of avoiding obscuring the invention with unnecessary detail.

For purposes of explaining the present invention, the term "finished beers" as used herein refers to a beer created for direct consumption and a beer that is identical (or generally identical) to a beer that would be purchased for consumption, generally containing alcohol at 3% to 20% alcohol by volume.

The term "residues" as used herein refers to a beer that is not for direct consumption, beer that has been culled from sale, the remains from beer fermentation or other process that are not for general sale, or other beer-based fermentation and production waste products. This last category of production waste products is often called "trub" in the brewing industry, and may contain a combination of yeast, hops, and other matter usually discarded after brewing is complete. Often, this waste is a solid or semi-solid slurry that is difficult to dispose of and would be impossible to distill conventionally.

The term "distillers beers" or fermented products that were designed to be distilled and are not for direct consumption are not included in the term "finished beers" as used herein, but as described herein may be utilized with the inventive process and system of the present invention.

The above terms, namely finished beers, residues, distillers beers, and the like are, for convenience herein, collectively referred to as "beer."

The term "distillation" as used herein refers to the separation of volatile from non-volatile components. These volatile components can be further separated from each other by bringing them to their boiling points. Non-volatile components cannot be distilled.

In accordance with the present invention, and as discussed in greater detail below, the system/method utilizes low or extremely low temperatures (e.g., lower than 180° F., 86° F. or other low temperature), as compared to temperatures used in known systems, and vacuum pressures (lower than atmospheric pressure, e.g., 28.6 inches of mercury vacuum) to advantageously prevent degradation of the base product, and to advantageously capture volatile compounds that are distinctly "of beer" in the final distilled product.

Distillation of low concentration (low alcohol by volume [% ABV]) alcoholic products is usually undertaken to create fuels, chemicals, or beverage-grade alcoholic products of greater concentration known as "spirits." The primary concern with the spirits creation is generally the efficiency of alcohol extraction process. While many different systems are known to maximize the yield of the distillate for the spirits creation, the present invention beneficially entails non-destructive distillation of the aromas and flavors of the low alcohol product . . . beer, rather than focusing on the alcohol yield. The present invention entails a process that preserves these aromas and flavor items at the expense of time and efficiency, which are the predominant factor in the fuel or wrought beverage production. The primary control for the herein-described inventive process is the temperature of the base beer during the process, rather than control of the temperature of the distillate being produced.

The present invention further beneficially, in certain embodiments, uses waste products, that is, entails reclamation of beer wastes and residues. These are products disposed of by breweries and are not seen as suitable for reclamation. Many of these wastes contain large quantities of compounds that would be unstable at high temperatures or even living organisms (such as yeast) that would decompose and create unsavory flavors. The present invention utilizes a distillation method/system that repurposes this waste into usable and valuable products that are alcoholic, in certain embodiments, and alcohol-free, in other embodiments.

The system/method of the present invention is specifically created for, but is not limited to, beers and residues that contain hops, fruits, spices, volatile and nonvolatile acids (sour beers), beers created with unusual fermentation techniques (wild beers, barrel aged beers, mixer fermentation, etc.), barrel aged beers, and beers containing specialty malts.

The distillation process employed within the present invention allows the inventive system/process to maintain the quality of the beer through the distillation process in order to create spirits and concentrates of high quality with the distinct character of the beers from which they originate. The inventive process/method and corresponding systems operates, in certain embodiments, as a batch-wise, and operates, in other embodiments, as continuous distillation process.

Certain embodiments of the present invention yield the most optimal results, but the described features of the process and system may also be adapted to current systems, in accordance with the specific steps and organization of the present invention.

Another benefit/feature of the present invention, in certain embodiments, is that the inventive system/method is designed for and may be used by licensed beverage spirits distilleries for the production of alcoholic spirits. Given the description herein, members of that industry are enabled to practice the present invention. On the other hand, if it is desired to concentrate beer wastes to recover non-alcoholic materials, licensed breweries and private users also are enabled, given the description herein, to utilize the present invention for that purpose.

In accordance with the present invention, a general description of the inventive system/process is as follows. Beer is initially added to a distillation vessel, the contents are placed under vacuum pressure, non-condensable gases are removed during or prior to depressurization with the addition of heat and agitation. Some volatile components are released during this process and condensed in the system. An initial vacuum pressure is reached and maintained using a computer-controlled vacuum pump and valve. The system may also be operated manually via the same pump and valve. Additional energy is added to begin the distillation process. Volatile components boil out of the beer and travel through the distillation column where they condense on one or more product condensers. The condensers can operate at different intensities of energy removal and include a vacuum trap and combination high volatiles condenser for the lowest boiling point volatiles (high volatiles) as well as to protect the vacuum pump. The condensate from the main condenser is fed through the reflux splitter which is programmed via the computer or a manual input to selectively return the main condensate to the distillation column and boiling vessel for further distillation. The condensate from the main condenser that is not fed back into the distillation column is collected as main condensate product and is part of the finished product. Condensate from the secondary condenser and the vacuum trap may also be collected and combined with the main condensate product to form the finished product. This may then be post processed to further separate aqueous and oil based components using simple phase separation. After the process is completed, the distillation system waste is removed to a drain for disposal.

As will be appreciated from the discussion that follows, the above basic summary of the invention entails a variety of variations, a variety of additional sub-operations/sub-steps, and the like.

Figure 2:
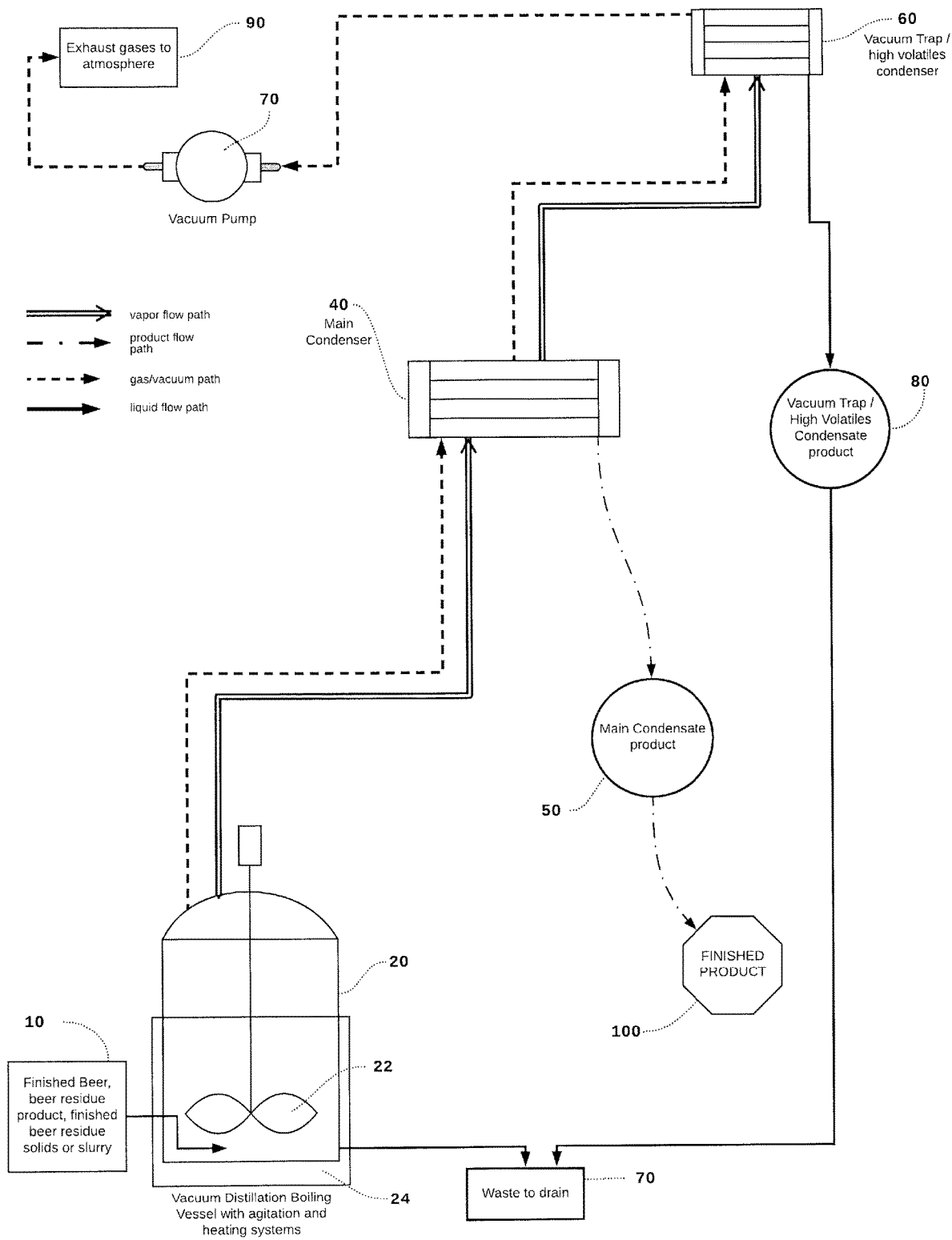
FIG. 2 is a schematic illustration of another distillation system in accordance with certain embodiments of the present invention.
Figure 3:
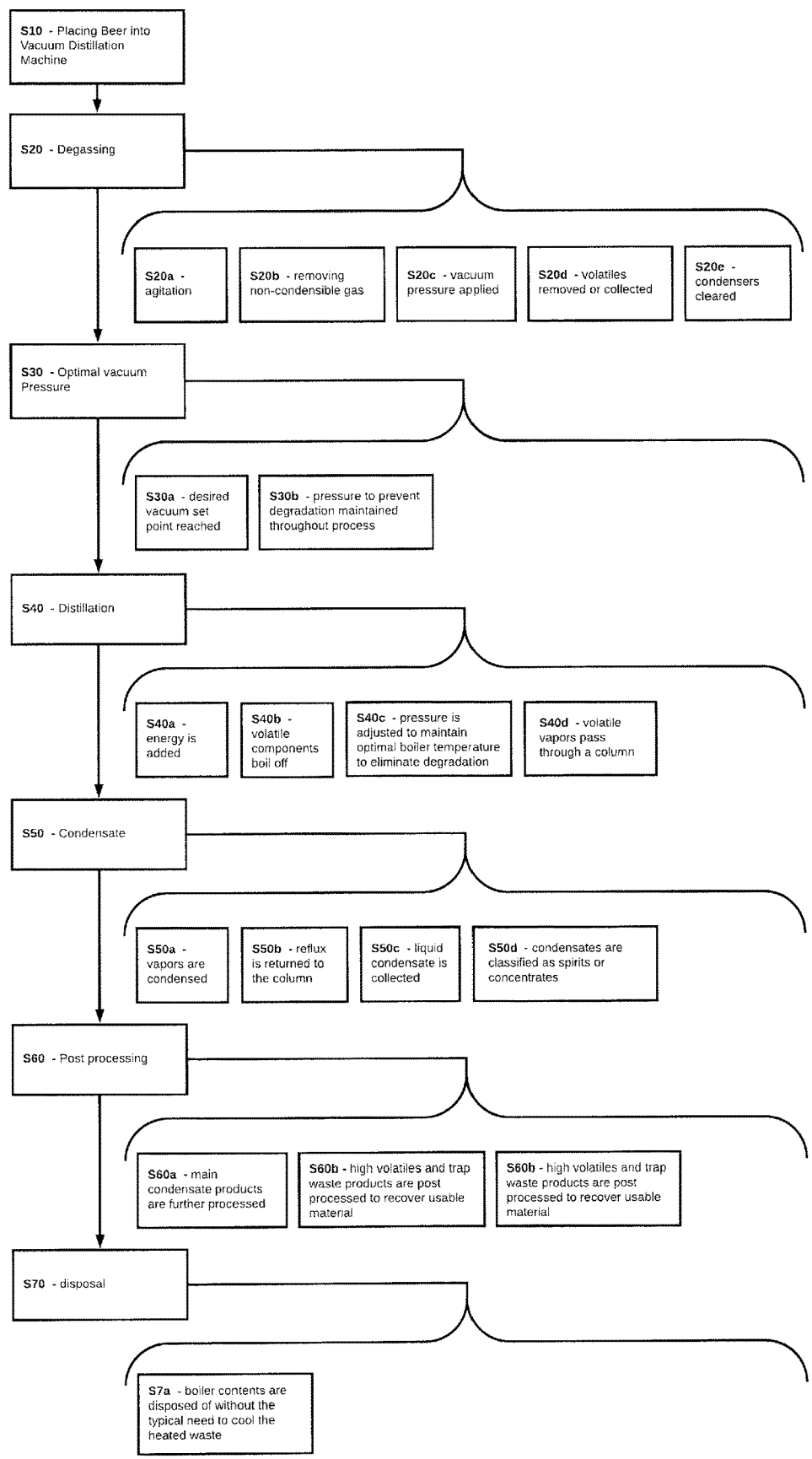
FIG. 3 is a diagram that illustrates the general process/system flow in accordance with certain embodiments of the present invention.

The present invention will now be described with reference to the accompany figures. FIG. 1 is a schematic illustration of the system of the present invention in accordance with various embodiments thereof. FIG. 2 is a schematic illustration of another system of the present invention in accordance with other embodiments. As illustrated, the system of FIG. 2 includes fewer structural components than the system of FIG. 1, but the operation is similar and will be appreciated given the discussion herein. FIG. 3 sets forth process steps that are carried out in accordance with the present invention.

As already mentioned herein, the present invention includes quite a few embodiments and variations thereof. Accordingly, the present invention is not limited solely to the precise structural components shown in either FIG. 1 or FIG. 2 and, likewise, is not limited solely to the precise process steps shown in FIG. 3. Rather, the figures are provided for the purpose of convenience to assist in understanding the present invention.

In FIGS. 1 and 2, both structural elements/devices are presented, as well as the general flow of components between those elements/devices. In these figures, a key is provided to identify what is flowing between the elements/devices. As shown, a double line arrow represents a vapor flow path; a dash-dot-dash line/arrow represents a product flow path, a fully dashed line/arrow represents a gas/vacuum path; and a solid line/arrow represents a liquid flow path. Although not every path flow is identified in the discussion herein, the illustrations presented in FIGS. 1 and 2 clearly establish, set forth and teach what is flowing between the various elements/devices in the system of the present invention.

With reference to the block diagram of FIG. 1, and as appropriate to FIG. 2, as well as the flow-chart shown in FIG. 3, it is seen that, initially as step S10, finished beer, beer residues, beer containing hops and hop residues, finished beer residue solids and/or slurry, and/or the like (collectively, beer 10) is placed into the metal or glass vacuum distillation machine of the present invention. Then, degassing step S20 is carried out by the Vacuum Distillation Boiling Vessel 20. As illustrated in FIG. 1, Vacuum Distillation Boiling Vessel 20 includes, in certain embodiments, an agitation system 22 and a heating system 24.

The inventive process and system may be utilized in or with a continuous distillation machine, in which case, steps S10 to S30 shown in FIG. 3 are performed simultaneously or nearly simultaneously with one other.

As part of the degassing step S20, the vacuum distillation Boiling Vessel 20 degasses the beer using agitation of the "beer" with the agitation system 22 and/or the application of vacuum to lower the pressure of the system. Heating system 24 may also be employed as part of the degassing step S20 to lower the solubility of the gas in the liquid. As shown in FIG. 3, the degassing step S20 includes sub-steps S20a through S20e.

As shown, the agitation step S20a is performed as part of the degassing step S20 in the Vacuum Distillation Boiling Vessel 20. Agitation may be of a low or high shear variety. In at least one embodiment, agitation employs baffles to increase the mixing of the contents of the vessel. In another embodiment that employs a continuous process, either one or several chambers are provided to carry out the agitation function and effect prior to distillation. Agitation may also be achieved, in certain embodiments, using a static or other mixer 22, a pumping action, or vibration (e.g., using ultrasound or a shaker), all in accordance with the present invention.

In step S20b, the entrained non-condensable gas is removed prior to distillation in order to prevent the stripping of aromatic and flavor compounds by these gases during distillation. In certain embodiments, the removal of non-condensable gas is performed as part of step S10, rather than S20, by utilizing an in-line degassing system in the Vacuum Distillation Boiling Vessel 20, in accordance with the same principle, and may utilize a static or other mixer during the loading process. In other embodiments, the removal of non-condensable gas is achieved as it is loaded into the Vacuum Distillation Boiling Vessel 20, using the agitation of the loading process as a way of degassing (e.g., splashing or spraying).

In step S20c, the vacuum pressure is applied gradually in order to prevent a sudden off-gassing of entrained gasses. In certain embodiments, the gradual pressure application is done by using stepped or ramped pressure of a vacuum pump 70, with the rates of pressure calculated and set depending on the total gas content of the beer. Preferably, the rate of degassing is tuned to the capacity of condenser 40, 42, 60 for the system, and calculated with mass flow, based on total volume, and/or simply as a time-based estimation. In another embodiment, this step is controlled by a computer system using data from the distillation machine's sensors to tune or inform this step. In other embodiments, step S20c is omitted. Generally, step S20c may be omitted if the desired product is of a relatively low volatility, such as with essential oils.

During the degassing phase and processing, it is necessary to operate a condenser 40, 42, 60, as indicated in step S20d, in order to remove the highly volatile components that may be caught up with the entrained non-condensable gases. In at least one embodiment of the present invention, the condenser 40 is utilized during at least the distillation and degassing phases. The present invention maintains a reduced temperature for the contents of the Vacuum Distillation Boiling Vessel 20 at or below 113° F., thereby preventing the decomposition and changes in the aroma profile of the initial product placed into the Vacuum Distillation Boiling Vessel 20 while undergoing distillation. In at least one embodiment, the temperature is maintained at or below 93° F. to prevent harm to any microorganisms preventing the introduction of chemicals that affect the flavor and contaminate the recovered materials.

The condensers 40, 42, 60 operate below the boiling point of the volatile components. In at least one embodiment, they operate below 32° F. (typically −321° F. to 27° F.) in order to condense volatile components from the entraining gases. Liquid nitrogen, dry ice, chilled brine, glycols or other anti-freeze fluids may be used as part of this step. In order to achieve proper removal of the volatile components, a primary or main condenser 40 may be utilized for this purpose. If the components released from the boiling vessel 20 are not to be recovered for use in a product, it may be preferable to bypass the main condenser 40 and instead allow a secondary condenser 42 or vacuum trap/high volatiles condenser 60 to solely condense the products. If chemical resistant equipment and safety precautions allow, and these chemicals are not desired to be recovered for use in a product, the volatiles may exit to atmosphere through the vacuum pump 70 without being condensed.

In addition, a specially constructed secondary condenser 42 and/or a dual purpose High Volatiles Condenser/Vacuum Trap 60, shown in FIG. 1, may be utilized to recover volatile components. In other embodiments, one or more separate volatile condensers are used to condense volatiles components, and may be cryogenic in nature. These secondary or intermediate condensers 42 may be placed between the main condenser 40 and the combined High Volatiles Condenser/Vacuum Trap 60. The optional secondary or intermediate condensers 42 may supplement operation or may also be used as a back-up for the main condenser 40.

The vacuum trap 60 functions to protect the pump, but may also be utilized for harvesting useful compounds from the distillation process. Alternatively, if high volatile chemicals are not of primary importance, the liquid condensate in the vacuum trap 60 may simply be emptied and discarded. The removal of highly volatile undesirable compounds may be facilitated by using chemically resistant vacuum pump equipment 70, which may pass the undesirable volatiles directly to the atmosphere (via 90) without any condensation taking place or they may be trapped in a gas scrubbing system post vacuum pump.

In step S20d, when the degassing process is complete, the condenser (or multiple condensers in certain embodiments) utilized in step S20 may be cleared of any condensed or frozen components which may also be collected in the vacuum trap 80 for the possible recombination with the main condensed product 50 into a final product 100, as shown in FIG. 1. The recombination may be achieved in a collection vessel that receives and combines, preferably in liquid form, at least a portion of the high volatile condensate compounds trapped by the at least one vacuum trap 80 with at least a portion of the main condensate product 50 into a final condensate product 100.

This step can also be completed after the distillation if the equipment is not able to isolate the condensers to be cleared under vacuum. The collected and condensed volatiles contain many of the most delicate aromas and flavor compounds, which are desirable for use in the final product or separately. Alternatively, they may also be discarded, if not needed, or when used to remove off-flavors prior to distillation. These initially collected volatile components may also undergo post-processing in step S60b before being combined with the main condensate product 50. In at least one other embodiment this post processing is in the form of dilution and phase separation prior to being added to the final condensate product 100.

In step S30, the vacuum pressure is set to prevent degradation of the beer and to facilitate low temperature distillation. In step S30a, the distillation system is brought to the desired vacuum pressure to allow the contents of the Vacuum Distillation Boiling Vessel 20 to boil at the desired temperature. As volatile components are removed from the Vacuum Distillation Boiling Vessel 20, the boiling point of the beer will increase regardless of the initial set vacuum pressure. In step S30b, to compensate, the vacuum may need to be constantly adjusted to keep the contents of the vessel 20 at their optimal temperature. In at least one other instance, the initial pressure of the distillation system is low enough to not need to be changed as the boiler contents increase in temperature. An example is if a vacuum of 29 inches of mercury were pulled, as opposed to the typical 28.6, and as the volatile components of the beer escaped, the higher vacuum pressure ensured that the beer never exceeded 113° F.

In step S40, the main distillation begins. In step S40a, additional energy, preferably as heat, is added to the boiling vessel in order to begin the distillation process. In step S40b, the volatile components from the "beer" boil off. In the present invention, this occurs at a lower temperature than normally utilized for similar beverage distillation due to the reduction in pressure, achieved by the systems' vacuum pump 70. In step S40c, in accordance with the present invention, by applying and controlling pressure on the contents of the Vacuum Distillation Boiling Vessel 20, the temperature of the contents is controlled with extreme accuracy and maintained optimally at or below 113° F. throughout the distillation and degassing operations. In other embodiments of the present invention, a scraped film or thin film evaporator is used instead of the boiling vessel 20. In further embodiments, the energy contained in the initial beer may be sufficient to create the main distillation process if the beer is put through a sudden and extreme pressure change. An example would be if an ambient or pressurized beer of 86° F. was injected into a vacuum distillation device and underwent extremely quick decompression. The resulting flash evaporation may not require additional energy input for the main distillation phase.

In the present invention, the typical utilized vacuum pressure is 28.6 inches of mercury vacuum, resulting in a typical beer temperature of 86° F. for a beer of 8% alcohol by volume. It is maintenance of the temperature of beer contained in the vessel that is key to the quality of the eventually distilled product. In comparison to the present invention, the atmospheric or minimally reduced pressure in the known distillation systems would result in a boiler temperature of 200° F., causing unacceptable degradation or destruction of the vital beer flavor compounds. Thus, because of lower temperature, which is achieved and maintained through the distillation and degassing phases in the present invention, as well as the system being controlled to preserve the base product rather than focusing on the temperature of the distilled product, the important beer flavor components are not destroyed or altered during distillation. In the case of hop essential oil (also referred to as hop oil or hop compounds), distillation from waste hop slurry, the process described in this application and illustrated in FIG. 2 prevents the destruction of the essential oils even as the temperature of the boiling vessel contents 20 rises. To compensate for the increasing temperature, the vacuum pressure is increased to lower the temperature, which in turn maintains an optimal temperature (or an optimal temperature) of the delicate hop particle bearing boiler contents.

The volatilized beer compounds travel from the boiler or Vacuum Distillation Boiling Vessel 20 to the main condenser 40 as illustrated in step S40. In at least one embodiment, the beer vapors may also travel through a distillation column 30 in the, in certain embodiments, optional step S40d. The use of a distillation column 30 is omitted in certain embodiments, in accordance with the present invention. In other embodiments, the distillation machine may have multiple distillation columns or evaporators, operating in accordance with the present invention and performing different iterations of the described distillation process.

The volatilized components may be further refined in the distillation column 30, which can use known designs. In at least one embodiment, at least some of the volatilized components can be condensed back into liquid by the condenser 40, while other volatilized components are collected in a secondary condenser 42.

The volatile components include water, various alcohols (primarily ethanol) volatilized oils (essential oils), esters, aldehydes, ketones, and countless other volatile chemicals that make up the volatilized components that are important to retaining the flavor and aroma of beer.

As indicated in step S50, the volatile component rich vapor is collected. This is facilitated in step S50a by the chilled surface of a condenser 40, 42, 60, turning the vapors containing volatile component into a liquid. This liquid may be selectively returned to the distillation column for additional processing in accordance with at least one embodiment of the present invention. The optional Reflux Splitter 32 may be used in step S50b to redirect at least a portion of the liquefied condensate product back into the optional distillation column 30 and/or the Vacuum Distillation Boiling Vessel 20, and another portion or part of the liquefied condensate collected as the main condensate product 50. This technique is known in the distillation field as "reflux distillation" and can be utilized as part of the described process in accordance with at least one embodiment of the present invention for making spirits as the finished product or removing unwanted alcohols.

The liquid condensate 50 is collected in step S50c as a main condensation product. This may be a spirit (if it contains alcohol) or a concentrate. In accordance with the present invention, the liquid condensate 50 will exhibit none of the degradation to the flavor and aroma that are caused by heat or chemical reactions in the distilled products that utilize known conventional beer distillation methods and systems. The collected condensate may be used or discarded as needed depending on the intended use for the final or finished product 100.

In at least one embodiment of the present invention, in step S60d, a collection vessel is used to receive and combine, preferably in liquid form, at least a portion of the high volatile condensate compounds 80 trapped by the at least one vacuum trap 60 or secondary condenser 42 with at least a portion of the main condensate product 50, combining and mixing them into a final finished condensate product 100. This step is optional, but may be desirable in some applications of the present invention, for example, where more enhanced flavors or aromas are desired.

If the condensed product contains ethanol, in step S50d, it is treated as a spirit and can be formulated as or used for various alcoholic beverage categories such as whiskey, specialty spirits, gin, etc. A final product that contains ethanol may also be treated as an alcohol based concentrate but must still comply with Federal and local law concerning alcoholic products.

The final condensed products that do not contain ethanol may also be created in accordance with the described distillation process. These products can contain essential oils or water-based products flavor and aromatic components, which may also be used in spirits, as scents, as a flavor addition for beer, as flavoring in non-alcoholic beverages, or sold directly as flavor enhancers. These condensates are treated as concentrates in step S50d.

The final condensed products that contain ethanol and non-ethanol components may be further processed to separate the ethanol from the non-ethanol products in step S60. Step S60a may be done by coalescing, centrifugation, phase separation, dilution, emulsification, evaporation, or semi-permeable membrane filtration. The non-alcohol products, such as, for example, essential oils, may be phase-separated 110 after distillation and further concentrated in an additional step. As part of the phase separation 110, the aqueous (heavy) phase final product 120 is separated from the oil (light) phase final product 130, as shown in FIG. 1.

After the distillation process is complete, the remaining compounds in the distillation boiler, or "bottoms product" of the continuous distillation system are disposed as waste 90 in accordance with the requirements of the local laws governing waste disposal procedures, as indicated in step S70. One of the many advantages of the herein-described methods of the present invention is that no cooling of the waste product is needed or required because of the low operational temperature of the present distillation process. In most states, the discharge of hot wastes is generally prohibited by law, which requires an additional step of cooling the discharged waste. No such step is needed with the present system and method, which operates at a level and temperature above simple compliance.

The present invention is described herein to include a number of beneficial features and functionality. In a variation of certain embodiments described herein, the present invention maintains a reduced temperature for the contents of the Vacuum Distillation Boiling Vessel 20 at or below 104° F. With a temperature at or below 104° F., various microorganisms and the most temperature sensitive components are optimally maintained in terms of their initial composition. Hence, the resulting distilled compounds fully or nearly fully retain their initial aroma and flavor.

In yet a further variation, the present invention maintains a reduced temperature for the contents of the Vacuum Distillation Boiling Vessel 20 at or below 96° F. With a temperature at or below 96° F., all or nearly all distilled compounds fully or nearly fully retain their initial aroma and flavor.

In yet another variation, the present invention maintains a reduced temperature for the contents of the Vacuum Distillation Boiling Vessel 20 at or below 180° F. With a temperature at or below 180° F., components of beer that are not degraded (or substantially degraded) at such temperatures result in distilled compounds that fully or nearly fully retain the initial aroma and flavor of such compounds. In such variation, it may preferable to avoid distilling components that include certain microorganisms that meaningfully degrade at temperatures lower than 180° F. and that would introduce an undesirable aroma, an undesirable flavor or other undesirable characteristic as a result of such degradation of those microorganisms.

In yet an additional variation, the present invention maintains a reduced temperature for the contents of the Vacuum Distillation Boiling Vessel 20 at or below 150° F. With a temperature at or below 150° F., components of beer that are not degraded (or substantially degraded) at such temperatures, which includes hop particles, result in distilled compounds that fully or nearly fully retain the initial aroma and flavor of those compounds, including the hop particles.

In certain embodiments, the system includes a computer, computer system, or a suitable computerized network or a computerized device having storage (e.g., computer memory) to store computer instructions, and one or more processors (CPUs) for executing the stored computer instructions. This computer or computer system (or other suitable device) (collectively, computer 200) is utilized, in such embodiments, to control the operation of the present invention. A suitably programmed computer controls any of the automated or programmable systems/methods, including the distillation and degassing operations, as well as reads, controls and maintains temperature and pressure of the system in accordance with the present invention. The computer may also provide alarms to an operator when the temperature or pressure exceeds designated or critical thresholds. In certain embodiments, the computer operates, controls and/or monitors the operation of the condenser(s), the vacuum pump, and/or the vacuum pressure control valve(s) 72. Additionally, the computer system may adapt to parameters to optimize the distillation of the base components.

The invention entails a system/process, in its various embodiments and variations, that revolves around the discovery by the inventor hereof that by controlling the temperature of the initial product, rather than controlling the temperature of the distilled product, with an eye toward preserving the integrity of the base material, a superior distilled beverage product is produced. Such inventive system/process is further enhanced, also in accordance with the present invention, by employing, in certain embodiments, computer control and different mechanical configurations. Quite differently, in the existing beverage industry, distillation systems are controlled for a desired distillation product vapor temperature.

In accordance with the herein-described invention, controlling the temperature of the distilled product in combination with utilizing previously unrecoverable, semi-solid, post use, biological waste results in a significant, novel contribution to the beer brewing industry as well as to the distilled beverage industry.

It is appreciated that while the invention has been explained in terms of various embodiments and variations thereof, and with reference to several figures, it is to be understood that many other possible variations, either structurally, functionally, and/or procedurally, can be made without departing from the spirit and scope of the invention. Accordingly, it is intended that the appended claims be interpreted as including the embodiments described herein, the alternatives and variations mentioned above, and all equivalents thereto.

What is claimed is:

1. A distillation method, comprising:
   receiving, into a vacuum distillation vessel, an initial product comprising at least one of a finished beer, a beer residue, a distillers beer, or a beer waste; and
   controlling, with the assistance of at least one processor, a vacuum pump fluidly coupled to the vacuum distillation vessel to sufficiently reduce pressure within the vacuum distillation vessel to cause volatile components within the initial product to boil, separate from the initial product within the vacuum distillation vessel, reach at least one condenser, and condense into an alcohol-based condensate,
   wherein the controlling of the vacuum pump maintains a temperature of both the initial product and the volatile components at or below 113 degrees Fahrenheit during separation of the volatile components from the initial product.

2. The distillation method of claim 1, wherein the controlling of the vacuum pump maintains the temperature of both the initial product and the volatile components at or below 93 degrees Fahrenheit during separation of the volatile components from the initial product.

3. The distillation method of claim 1, further comprising:
   agitating the initial product such that a non-condensable gas embedded within the initial product separates from the initial product.

4. The distillation method of claim 3, further comprising trapping and condensing, in a particular one of the at least one condenser, components carried by the non-condensable gas separated from the initial product.

5. The distillation method of claim 4, further comprising combining, in a collection vessel, the trapped and condensed components from the particular one condenser with the volatile components condensed into the alcohol-based condensate to produce a final alcohol-based condensate product, wherein the final alcohol-based condensate product has a higher concentration of alcohol than the initial product.

6. The distillation method of claim 4, wherein the particular one condenser is a vacuum trap.

7. The distillation method of claim 6, wherein the at least one condenser includes at least two fluidly coupled condensers in fluid communication with the vacuum trap.

8. The distillation method of claim 1, wherein the initial product includes compounds that are unstable at temperatures above 120° Fahrenheit.

9. The distillation method of claim 1, wherein the initial product includes beer wastes having hop particles containing essential oils, the volatile components separated from the initial product include a portion of the essential oils, and the portion of essential oils are not degraded during separation of the volatile components from the initial product or during condensing of the volatile components into the alcohol-based condensate.

10. The distillation method of claim 1, wherein the initial product includes living microbial organisms that would be destroyed if temperature in the vacuum distillation vessel were to exceed 120° Fahrenheit.

11. The distillation method of claim 1, further comprising guiding, using at least one distillation column fluidly coupled to the vacuum distillation vessel and the vacuum pump, the volatile components separated from the initial product to the at least one condenser.

12. The distillation method of claim 1, wherein the vacuum pump includes a valve fluidly coupled to the vacuum distillation vessel, and the controlling of the vacuum pump includes controlling the valve to regulate the pressure within the vacuum distillation vessel.

* * * * *